United States Patent
Harvey

(10) Patent No.: US 10,504,125 B2
(45) Date of Patent: Dec. 10, 2019

(54) METHODS, SYSTEMS, AND PRODUCTS FOR TARGETING CONTENT

(75) Inventor: Brent C. Harvey, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1391 days.

(21) Appl. No.: 12/643,738

(22) Filed: Dec. 21, 2009

(65) Prior Publication Data

US 2011/0153420 A1 Jun. 23, 2011

(51) Int. Cl.
*G06Q 30/02* (2012.01)

(52) U.S. Cl.
CPC ......... *G06Q 30/02* (2013.01); *G06Q 30/0254* (2013.01); *G06Q 30/0275* (2013.01)

(58) Field of Classification Search
CPC . G06Q 30/02; G06Q 30/0254; G06Q 30/0275
USPC ...... 705/14.49, 14.55, 14.66, 14.71, 37, 1.1, 705/14.42; 707/709; 725/22, 34, 32; 709/203; 463/16
See application file for complete search history.

(56) References Cited

U.S. PATENT DOCUMENTS

| | | | | |
|---|---|---|---|---|
| 7,216,102 | B2 * | 5/2007 | Nabe .............................. | 705/37 |
| 8,640,160 | B2 * | 1/2014 | Stefanik ................. | H04N 5/445 725/109 |
| 2001/0056573 | A1 * | 12/2001 | Kovac .................... | G06Q 30/02 725/32 |
| 2002/0032602 | A1 * | 3/2002 | Lanzillo, Jr. ........... | G06Q 30/02 705/14.66 |
| 2002/0038302 | A1 * | 3/2002 | Maeda ................... | G06Q 30/02 |
| 2002/0143560 | A1 * | 10/2002 | Hanson .................. | G06Q 40/04 705/1.1 |
| 2002/0194103 | A1 * | 12/2002 | Nabe ...................... | G06Q 30/08 705/37 |
| 2004/0073482 | A1 * | 4/2004 | Wiggins et al. ................ | 705/14 |
| 2007/0077981 | A1 * | 4/2007 | Hungate ................ | G06Q 20/20 463/16 |
| 2007/0288953 | A1 * | 12/2007 | Sheeman et al. ............... | 725/34 |
| 2008/0167943 | A1 * | 7/2008 | O'Neil ................... | G06Q 30/02 705/7.34 |
| 2008/0189736 | A1 * | 8/2008 | Edwards ............. | G06F 17/3079 725/34 |
| 2008/0197185 | A1 * | 8/2008 | Cronin et al. ................. | 235/375 |
| 2008/0216107 | A1 * | 9/2008 | Downey ............ | H04N 7/17318 725/22 |

(Continued)

FOREIGN PATENT DOCUMENTS

WO    WO-2005101863 A2 * 10/2005 ............. G06Q 30/02

OTHER PUBLICATIONS

Leyli Javid Khayati, Privacy-preserving targeted advertising scheme for IPTV using cloud, 2009 (Year: 2009).*

*Primary Examiner* — Tarek Elchanti
(74) *Attorney, Agent, or Firm* — Scott P. Zimmerman, PLLC

(57) ABSTRACT

Methods, systems, and products deliver target content to a pool of candidates. A target specification is received. A database of subscribers is queried for the target specification, and a pool of communications addresses is retrieved having demographic information matching the target specification. An auction is conducted for the pool of communications addresses, and a winning bidder's content is sent to the pool of communications addresses.

6 Claims, 11 Drawing Sheets

(56) References Cited

U.S. PATENT DOCUMENTS

| | | | |
|---|---|---|---|
| 2009/0132358 A1* | 5/2009 | Heck | G06Q 30/02 705/14.42 |
| 2009/0132374 A1* | 5/2009 | Weathersby | 705/14 |
| 2010/0114716 A1* | 5/2010 | Heilig | G06Q 30/02 705/14.71 |
| 2010/0125563 A1* | 5/2010 | Nair | G06Q 30/02 707/709 |
| 2011/0137975 A1* | 6/2011 | Das | G06F 21/6254 709/203 |

* cited by examiner

FIG. 2

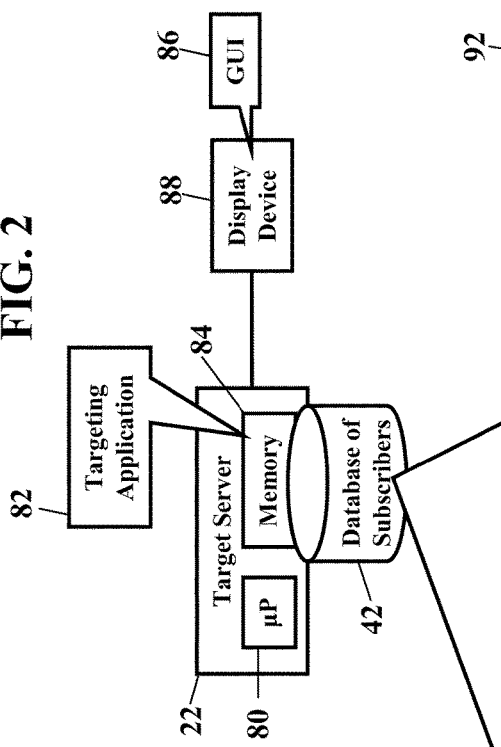

| Comm Address | Address | Name | Device Info | Property Info | Tax Info | Litigation Info | Income | Motor Vehicle Info | Content Info |
|---|---|---|---|---|---|---|---|---|---|
| bob@isp.com | 123 Main NY 10010 | Bob Smith | IPOD 12443 ISP:AT&T | Beach house; Business equipment | 2007: $2511 2008: $3801 | No info | $76,000 | 2008 Subaru 2003 Bayliner | Disney HBO PBS |
| 134.8.1.12 | 21 E. Front Lima OH | Mike Davis | NOKIA 8120 AT&T | 621 E. Front Lima OH | 2007: $755 2008: $790 | Ch. 11 Bankruptcy 2008 | $22,000 | 2006 Honda Wells Cargo | Content Log |
| (123)456-7890 | 888 Peach Atlanta GA | Mary Jones | XBOX INTEL CPU 754980 | Detached garage; pool permit | 2006: $6908 | Divorce 2003 | $150,000 | 1968 Chev 1970 Ford | 2 MB/hour average |

(12) United States Patent

METHODS, SYSTEMS, AND PRODUCTS FOR TARGETING CONTENT

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to electrical computers and, more particularly, to targeting of content to clients.

Targeted content is desirable. Subscribers have hundreds of channels and thousands of music, movie, and other content choices. Many subscribers thus only want content that matches their interests. Content providers also want to target content to only those most receptive.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 2 and 3 are more detailed schematics illustrating the operating environment, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
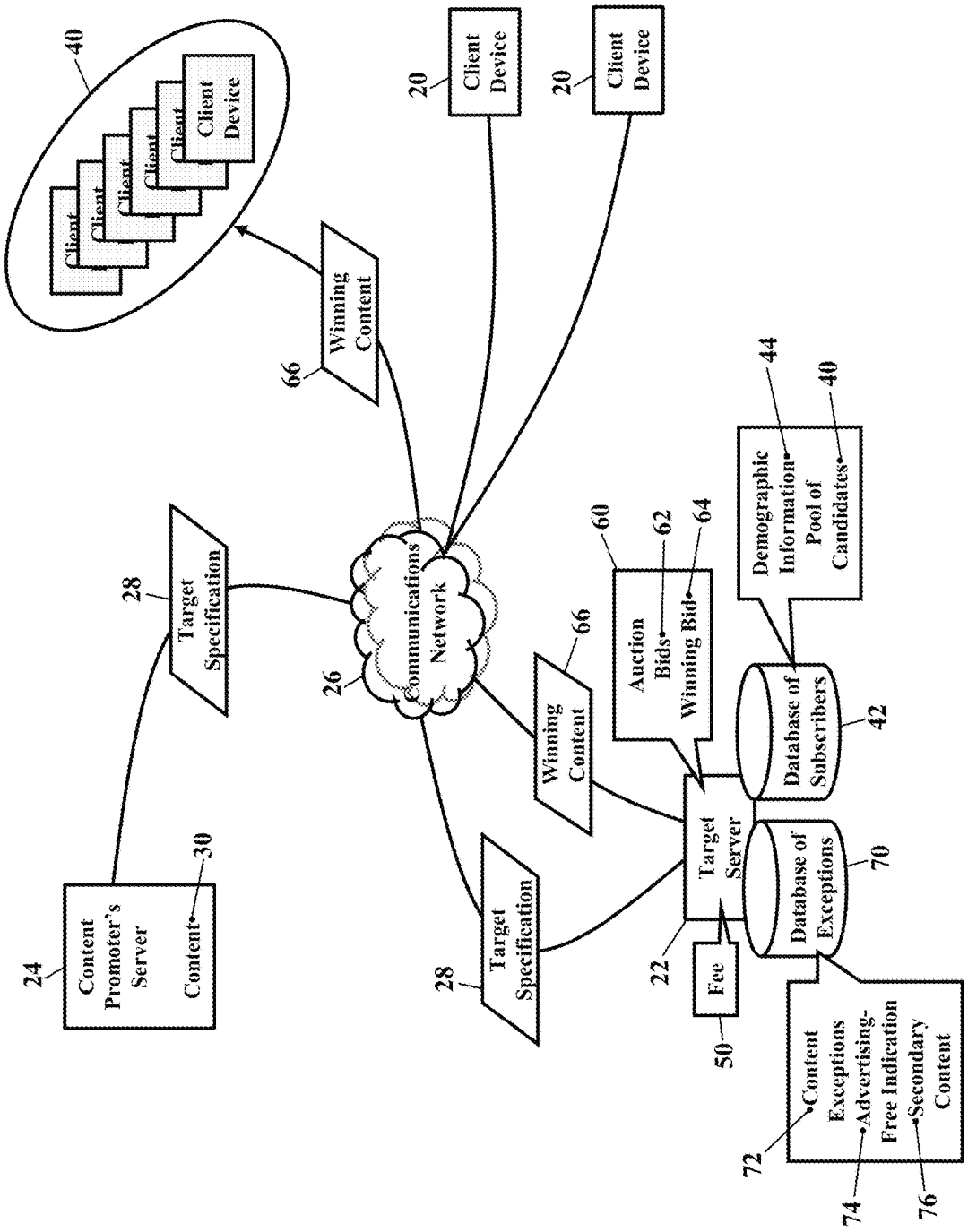
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that delivers targeted content to one or more client devices 20. A target server 22 communicates with a content promoter's server 24 and with the client devices 20 via a communications network 26. The target server 22 receives a target specification 28 from the content promoter's server 24. The target specification 28 describes one or more requirements that are associated with some content 30. The target specification 28, in other words, describes one or more traits that are more likely to appeal to an intended or targeted audience for the content 30. The content promoter naturally wants the content 30 delivered to the client devices 20 that are more likely to positively respond and, thus, purchase some product or service.

The target server 22 may then develop a pool 40 of candidate addresses. The target server 22 retrieves client addresses that are more likely to satisfy the content promoter's target specification 28. The target server 22 queries a database 42 of subscribers for the content promoter's target specification 28. The database 42 of subscribers contains demographic information 44 associated with each client device 20. The database 42 of subscribers returns the pool 40 of candidates that are associated with the target specification 28. Each candidate may include an address that is associated with the target specification 28. Each candidate may be a communications address (such as an Internet Protocol address or email address), yet the communications address may include a physical address.

A simple example may help explain the pool 40 of candidates. Suppose a diaper advertiser wants a diaper advertisement sent to the client devices 20 that are associated with diaper-age children. Perhaps the broadest target specification 28 may be a demographic age between twenty (20) and forty (40) years. The diaper advertiser, in other words, only wants the diaper advertisement sent to the client devices 20 that are associated with users between twenty (20) and forty (40) years of age. Any client devices 20 associated with younger or older users may be less inclined to purchase child diapers. The target server 22 queries the database 42 of subscribers for the client devices associated with an age field between 20 and 40 years (20K age≤40). The database 42 of subscribers returns the pool 40 of candidates that have some association matching an age between 20 and 40 years. Regardless, the target server 22 has winnowed the database 42 of subscribers to retrieve only those client devices 20 associated with the advertiser's target specification 28. This example is simple, for the target specification 28 may be more complicated (as later paragraphs will explain).

A candidate may be a member of multiple pools. Because the database 42 of subscribers contains the demographic information 44, some (or most) client devices may be associated with multiple entries of the demographic information 44. The demographic information 44 may contain very detailed categories, such as hobbies, interests, travels, sports, income, purchases, vehicles, address, and friends (as later paragraphs will explain). A single subscriber, in other words, may be associated with different and diverse demographic information 44. Most subscribers may thus be members of multiple pools, depending on each target specification 28.

The target server 22 may impose a fee 50 for the pool 40 of candidates. Because the database 42 of subscribers contains demographic information 44 associated with each client device 20, the database 42 of subscribers may contain valuable, even proprietary, information. The target server 22 may thus charge the fee 50 for querying the database 42 of subscribers. The fee 50 may be a simple flat-fee for each query, or the fee 50 may depend on the complexity of the target specification 28. If the target specification 28 is simple and/or broadly defined, for example, then the pool 40 of candidates may be large and broadly targeted. If, however, the target specification 28 is complex and/or narrowly defined, then the pool 40 of candidates may be small and narrowly targeted. The target server 22, then, may impose the fee 50 for retrieving the pool 40 of candidates. The fee 50 may depend on the granularity or complexity of the target specification 28.

The target server 22 may even conduct an auction 60. The target server 22 may have reduced the database 42 of subscribers to only those client devices 20 most likely to respond to the target specification 28. The target server 22 may "open up" competition for the pool 40 of candidates by conducting the auction 60. Even though one advertiser may have specified the target specification 28, other advertisers may wish to compete for the same pool 40 of candidates. The target server 22, then, may solicit multiple advertisers with the target specification 28 and the resulting pool 40 of candidates. The target server 22 may accept bids 62 from different content promoters, and the winning bid 64 is selected.

The winning bidder may have its winning content 66 (e.g., advertisement) sent to the pool 40 of candidates. When any member of the pool 40 of candidates requests content, the target server 22 sends the winning content 66. The winning content 66 is sent to the communications address (such as an Internet Protocol address) associated with the requesting client device 20. The winning content 66 is thus targeted to the demographic information 44 associated with the client device 20.

Before sending the winning content 66, though, the target server 22 may consult a database 70 of exceptions. The database 70 of exceptions may store content exceptions 72 that are associated with each client device 20. A client device 20, for example, may opt out of categories of content that are objectionable to a user of the client device 20. Horror, profanity, and sexual content are categories that many users may decline to receive. The categories of content, however, may be specifically defined to include financial advertisements, fast food advertisements, and even diaper advertisements. So, before the winning bidder's winning content 66 is sent to an individual device within the pool 40 of candidates, the target server 22 may first compare a content category associated with the winning content 66 to the content exceptions 72 stored in the database 70 of exceptions. If the content category matches the content exceptions 72 associated with the client device 20, then the target server 22 may decline to send the winning content 66 to the client device 20. Here, then, the user of the client device 20 may opt out of objectionable categories of content.

The database 70 of exceptions may also prohibit advertisements. Here the user of the client device 20 may "buy out" of advertisements by paying a fee. If a user wishes to receive content without advertisements, here the user may subscribe to or pay a fee for elimination of advertisements. The database 70 of exceptions may then store an advertising-free indication 74. When the target server 22 queries the database 70 of exceptions, the advertising-free indication 74 causes the target server 22 to decline insertion or sending of advertisements to the client device 20.

The database 70 of exceptions may also specify secondary content 76. When the target server 22 queries the database 70 of exceptions, here the secondary content 76 is substituted for the winning content 66. The secondary content 30 may be any content the user specifies or selects to replace the winning content 66. The user, for example, may be willing to pay a fee to receive ESPN® programming in place of the winning content 66. Whenever the winning content 66 is to be sent to the user's client device 20, the target server 22 may instead send the secondary content 30 to the user's client device 20. Instead of one or more thirty (30) second commercial, the user's client device 20 may instead receive thirty (30) seconds of sports highlights from ESPN®.

Exemplary embodiments may be manually or automatically activated. When any member of the pool 40 of candidates requests content, exemplary embodiments may automatically activate to deliver targeted content (such as the winning content 66 or the secondary content 30) to the requesting client device 20. Targeted content, for example, may be automatically inserted into an advertising slot in an Internet Protocol stream of data. That is, exemplary embodiments may automatically deliver targeted advertisements and/or programs in response to requests for content. Exemplary embodiments, however, may also be manually performed when desired.

Figure 3:
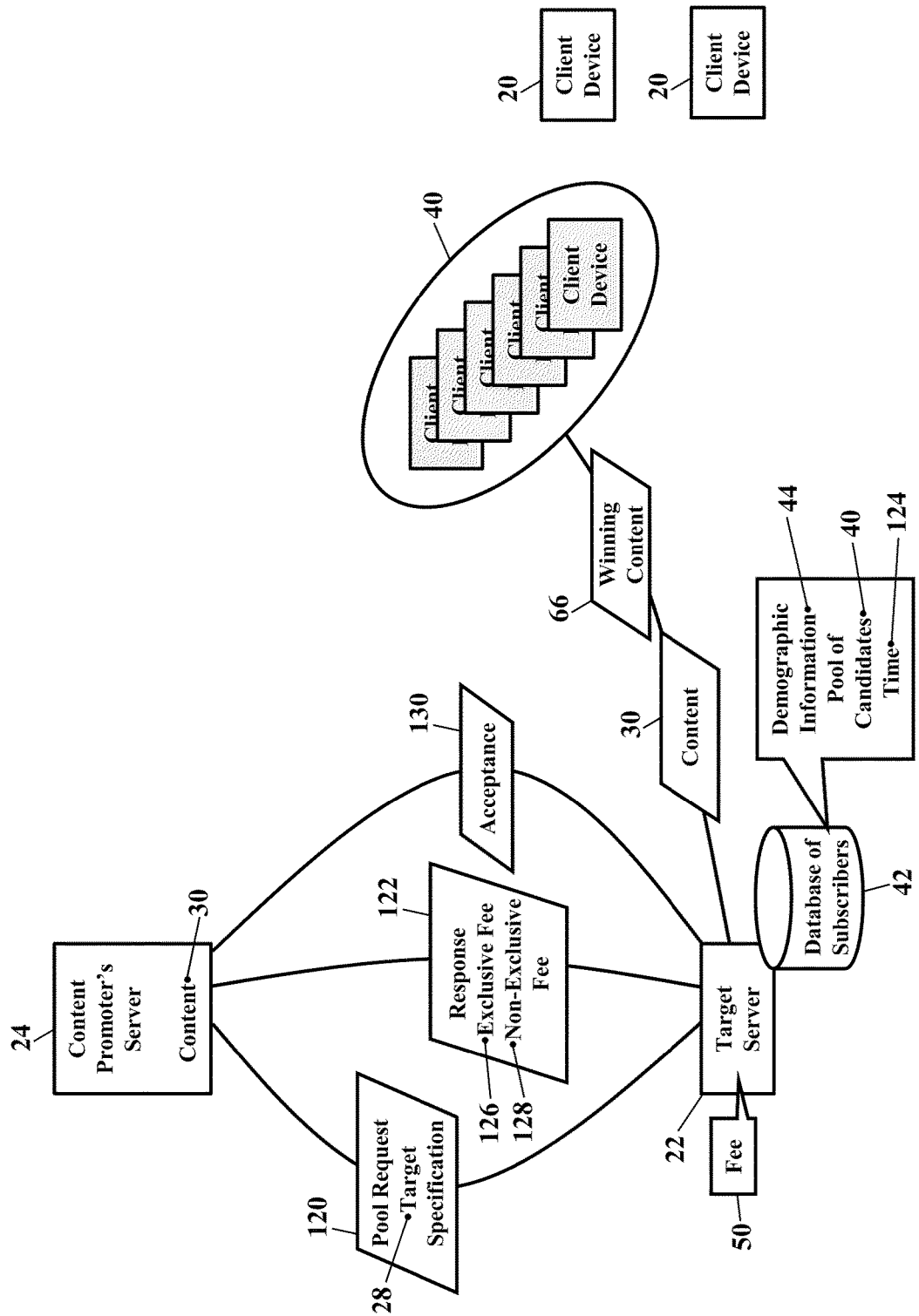
Figure 4:
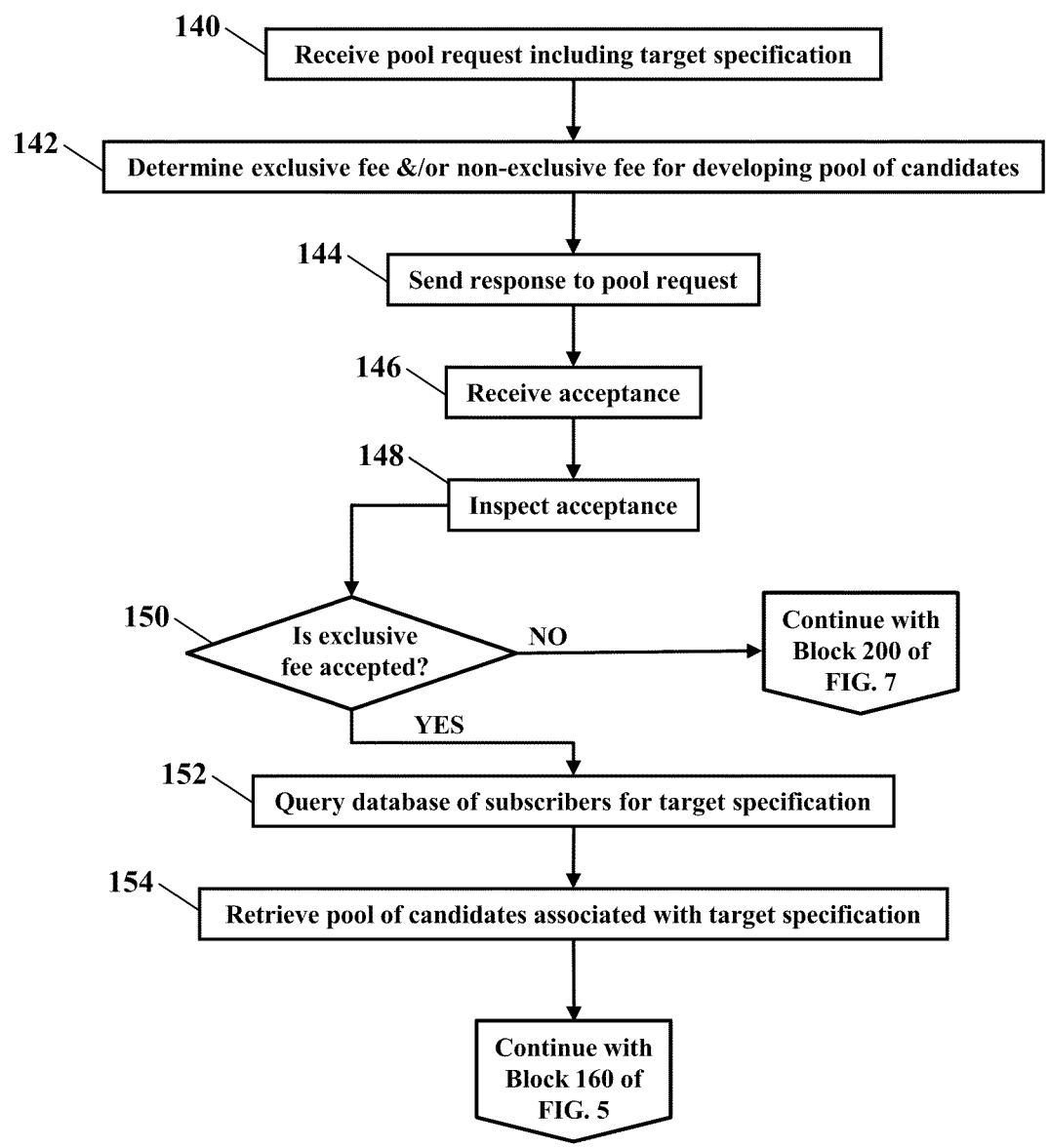
FIGS. 4-9 are flowcharts illustrating a method of targeting content, according to exemplary embodiments.

FIGS. 2 and 3 are more detailed schematics illustrating the operating environment, according to exemplary embodiments. Here the target server 22 has a processor 80 (e.g., "μP"), application specific integrated circuit (ASIC), or other component that executes a targeting application 82 stored in a memory 84. The targeting application 82 may cause the processor 80 to produce a graphical user interface ("GUI") 86. The graphical user interface 86 is illustrated as being visually produced on a display device 88, yet the graphical user interface 86 may also have audible features. The targeting application 82, however, may operate in any processor-controlled device, as later paragraphs will explain.

The target server 22 builds and/or accesses the database 42 of subscribers. The database 42 of subscribers is illustrated as being locally stored in the memory 84, but the database 42 of subscribers may be remotely accessed and maintained at any location in communications network (illustrated as reference numeral 26 in FIG. 1). Regardless, the database 42 of subscribers stores a communications ("Comm") address 90 associated with each client device 20. The database 42 of subscribers also relates each communications address 90 to the demographic information 44. FIG. 2, for example, illustrates the database 42 of subscribers as a table 92 that maps, relates, or otherwise associates the communications address 90 to various entries of the demographic information 44. Each communications address 90, for example, may be associated with a physical address 94. If the database 42 of subscribers is compiled by an Internet Service Provider or by a network provider, the physical address 94 may be a subscriber's billing address or an address at which equipment is installed or maintained. The database 42 of subscribers may also relate each communications address 90 to a name 96, such as a subscriber's name or a user's name. Each communications address 90 may be associated with device information 98, such as a manufacturer, model, or component name.

The database 42 of subscribers may store other demographic information 44. The database 42 of subscribers may include any information that is publically obtained. Because the name 96 and physical address 94 may be known from subscriber records, the subscriber's name 96 and physical address 94 may be used to query other databases. The name 96 and physical address 94, for example, may be used to query governmental databases, such as property databases, tax databases, and litigation databases. The database 42 of subscribers may thus store property information 100, tax information 102, and litigation information 104 associated with each communications address 90. The property information 100, for example, may describe real and/or personal property for which taxes are paid and/or which are tracked by local, state, or Federal governments. If income 106 is not publically available from a tax database, then a subscriber's income information 106 may be inferred from the property information 100 (e.g., the value of a residence). Each communications address 90 may be associated with any information that may be obtained from, or inferred from, publically available databases.

Motor vehicle registrations provide an example. Many states maintain online databases of motor vehicle registrations. Because the name 96 and physical address 94 may be known from subscriber records, the subscriber's name 96 and physical address 94 may be used to query databases storing motor vehicle registrations (such as databases maintained by a Department of Motor Vehicles and/or Secretary of State). The database 42 of subscribers may thus store motor vehicle information 108 that describes cars, trucks, trailers, boats, and other vehicular information. Exemplary embodiments may then use the motor vehicle information 108 to obtain or to infer the make, model, and year of cars, boats, airplanes, trailers, and other vehicles owned by the subscriber.

The database 42 of subscribers may also store demographic information 44 from private databases. Because the subscriber's name 96 and physical address 94 may be known from subscriber records, known demographic information 44 may be used to query private databases. Social networking databases (such as FACEBOOK®) may be searched for the subscriber's name 96 and physical address 94. Pictures and personal information may be obtained. Department store records, credit card records, and financial/banking records may also be searched. Whatever information that can be retrieved and associated to the client device's communications address 90 may be stored in the database 42 of subscribers.

The private databases may yield a wealth of information. Suppose a social networking database is searched for the subscriber's name 96 and physical address 94. If a picture of the subscriber is retrieved, the picture may reveal hair color, clothing styles, eyeglasses, height, weight, and other physical traits. Text, blogs, or daily diaries may reveal travel destinations, daily habits, names of friends, likes and dislikes, and other personal information.

The database 42 of subscribers may also store content information 110. The content information 110 describes current and/or historical content sent to the client device's communications address 90. The content information 110 may be any information that helps identify what content is delivered to each client device 20. The content information 110, for example, may be a time/channel log of content titles showing what content is or was received during a period of time. Content logs, however, may be cumbersome, especially for content heavy users. The content information 110, then, may be simplified as a measure of received content, such as a daily/weekly/monthly total or an average rate (e.g., bits per second) during a period of time that is delivered to each communications address 90.

The database 42 of subscribers is thus a rich repository of information. If the name 96 and/or the address 94 can be obtained, then exemplary embodiments may build the diverse, even comprehensive, repository of information associated to the client device's communications address 90. An Internet Service Provider and/or a network provider may thus utilize their subscriber records to compile the database 42 of subscribers. Any entity, in fact, may use their subscriber information to develop a comprehensive repository of the demographic information 44. The database 42 of subscribers may thus store valuable information that advertisers and other content promoters may covet.

FIG. 3 illustrates a pool request 120, according to exemplary embodiments. The content promoter's server 24 sends the advertiser's pool request 120 to the target server 22. The pool request 120 may include the target specification 28 describing one or more demographic requirements associated with the promoter's content 30. The content promoter wants the content 30 targeted to the client devices 20 that are more likely to positively respond, so the target specification 28 describes one or more demographic traits desired by the client devices 20.

The targeting application 82 may first determine the fee 50 associated with the advertiser's pool request 120. Because the database 42 of subscribers contains valuable, even proprietary, demographic information 44 associated with each client device 20, the targeting application 82 may impose the fee 50 to develop the pool 40 of candidates that are associated with the target specification 28. The targeting application 82, in other words, may charge the content promoter the fee 50 for querying the database 42 of subscribers for the target specification 28. While the fee 50 may be a simple flat-fee for each query, the fee 50 may depend on the complexity of the target specification 28. If the target specification 28 requires only a simple query, then the fee 50 may be less. When, however, the target specification 28 is complex and/or narrowly defined, then the database 42 of subscribers may need to be refined to include the desired data. The fee 50 may thus depend on the granularity or complexity of the target specification 28.

An example may help explain different fee structures. Suppose the content promoter (or "advertiser") is willing to pay different fees for different target specifications 28. The advertiser, for example, may be willing to pay a small fee (e.g., $0.000001) per general impression in a web search listing. The advertiser, however, may be willing to pay $0.05 per impression for confirmed left handed motorcycle owners in the 90210 ZIP code watching the program "COPS" between the hours of 1100 and 1400. The advertiser is thus willing to pay a fee based on the granularity of the target specification 28. If the database 42 of subscribers does not contain the demographic information 44 to accurately satisfy the detailed target specification 28 (such as the "left handed" requirement), then data must be gathered to determined right or left handedness. The database 42 of subscribers may thus need refinement to include "left handed" demographic information 44. The fee 50 may thus represent the data collection efforts to satisfy the granularity or complexity of the target specification 28.

The fee 50 may also represent an exclusive or non-exclusive pool. Once the fee 50 is determined, the target server 22 may send a response 122. The response 122 is sent to the content promoter's server 24, and the response 122 may include the fee 50 associated with the target specification 28. The fee 50, however, may also represent an exclusive or non-exclusive effort. If the advertiser or content promoter wants exclusive use of the pool 40 of candidates that are associated with the target specification 28, then the fee 50 may increase to reflect the exclusivity of the search results. An exclusive pool 40 of candidates, in other words, is only available for use by a paying advertiser. Only the advertiser's content 30 will be sent to the pool 40 of candidates. Other advertisers (such as competing advertisers) may be excluded from the same pool 40 of candidates for a period of time 124. If FORD® pays for an exclusive pool 40 of candidates, then TOYOTA®, GENERAL MOTORS®, and HOME DEPOT® may not have their advertisements sent to the same pool 40 of candidates. If, however, the advertiser is not willing to pay a surcharge for exclusive use of the pool 40 of candidates, then the fee 50 for the target specification 28 may be non-exclusive.

The content promoter or advertiser may thus choose exclusivity. When the content promoter's server 24 receives the response 122, the response 122 may include an exclusive fee 126 and a non-exclusive fee 128. The exclusive fee 126 is charged for exclusive use of the pool 40 of candidates, while the non-exclusive fee 128 allows other advertisers to send content to the same pool 40 of candidates. The content promoter or advertiser may thus send an acceptance 130 to the target server 22. The acceptance 130 accepts either the exclusive fee 126 or the non-exclusive fee 128 to develop the pool 40 of candidates associated with the target specification 28. A denial, of course, declines both the exclusive fee 126 and the non-exclusive fee 128.

FIGS. 4-9 are flowcharts illustrating a method of targeting content, according to exemplary embodiments. The target server 22 receives the advertiser's pool request 120 including the target specification 28 (Block 140). The targeting application 82 determines the exclusive fee 126 and/or the non-exclusive fee 128 associated with the target specification 28 (Block 142). The targeting application 82 sends the response 122 including the exclusive fee 126 and/or the non-exclusive fee 128 (Block 144). The content promoter's server 24 sends the acceptance 130 to the target server 22, and the acceptance 130 is received (Block 146). The acceptance 130 is then inspected (Block 148). If the exclusive fee 126 is declined (Block 150), then the flowchart continues with Block 200 of FIG. 7. If the exclusive fee 126 is accepted (Block 150), then the database 42 of subscribers is queried for the target specification 28 (Block 152). The search results yield the pool 40 of candidates that are associated with the target specification 28 (Block 154).

Figure 5:
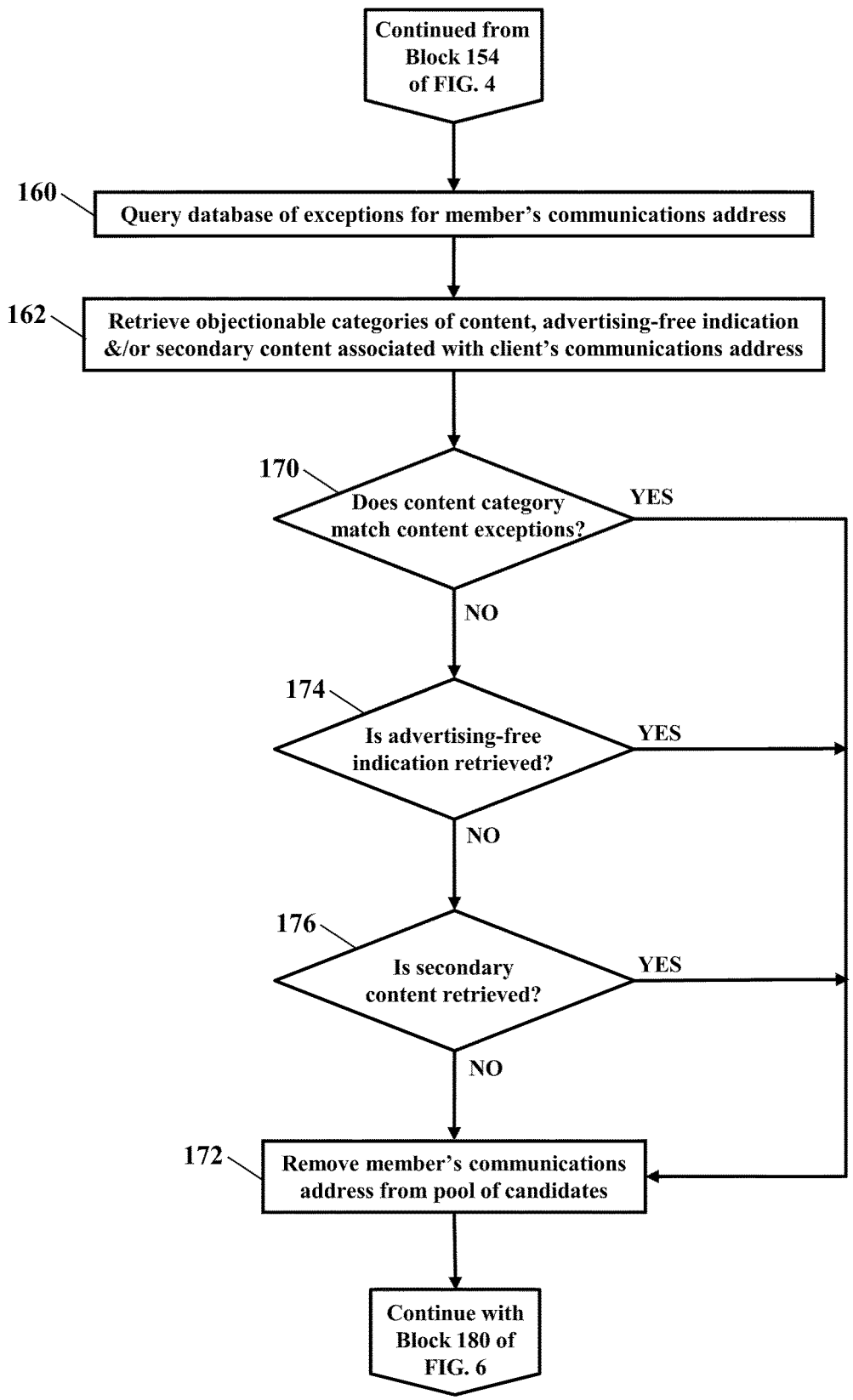

The flowchart continues with FIG. 5. Even though the pool 40 of candidates is known, some members may have "opted out" of some kinds of content. FIG. 5, then, illustrates checks that remove a member from the pool 40 of candidates. Before any content is sent to the pool 40 of candidates, the database 70 of exceptions may be queried for a member's communications address (Block 160). The database 70 of exceptions may store objectionable categories of content associated with each client device 20. The database 70 of exceptions may also store the advertising-free indication 74 that causes the target server 22 to decline insertion or sending of advertisements to the client device 20. The database 70 of exceptions may also specify the secondary content 30 that is substituted for advertising content. When the database 70 of exceptions is queried for the member's communications address (Block 160), the database 70 of exceptions returns the objectionable categories of content, the advertising-free indication 74, and/or the secondary content 30 associated with each client's communications address (Block 162). If the content category associated with the requesting content promoter's content 30 (who paid the exclusive fee 126) matches the content exceptions 72 associated with the client device 20 (Block 170), then the target server 22 may remove the member's communications address from pool 40 of candidates (Block 172). Because the member does not wish to receive objectionable categories of content, then the target server 22 may remove the subscriber from the pool 40 of candidates. If the advertising-free indication 74 is retrieved (Block 174), then the target server 22 may also remove the member's communications address from pool 40 of candidates (Block 172). The member does not wish to receive advertising content, so the member is removed from the pool 40 of candidates. If the secondary content 30 is retrieved (Block 176), then the target server 22 may also remove the member's communications address from pool 40 of candidates (Block 172). The member has specified that the secondary content 30 is to replace targeted advertisements and programming, so the member is removed from the pool 40 of candidates.

Figure 6:
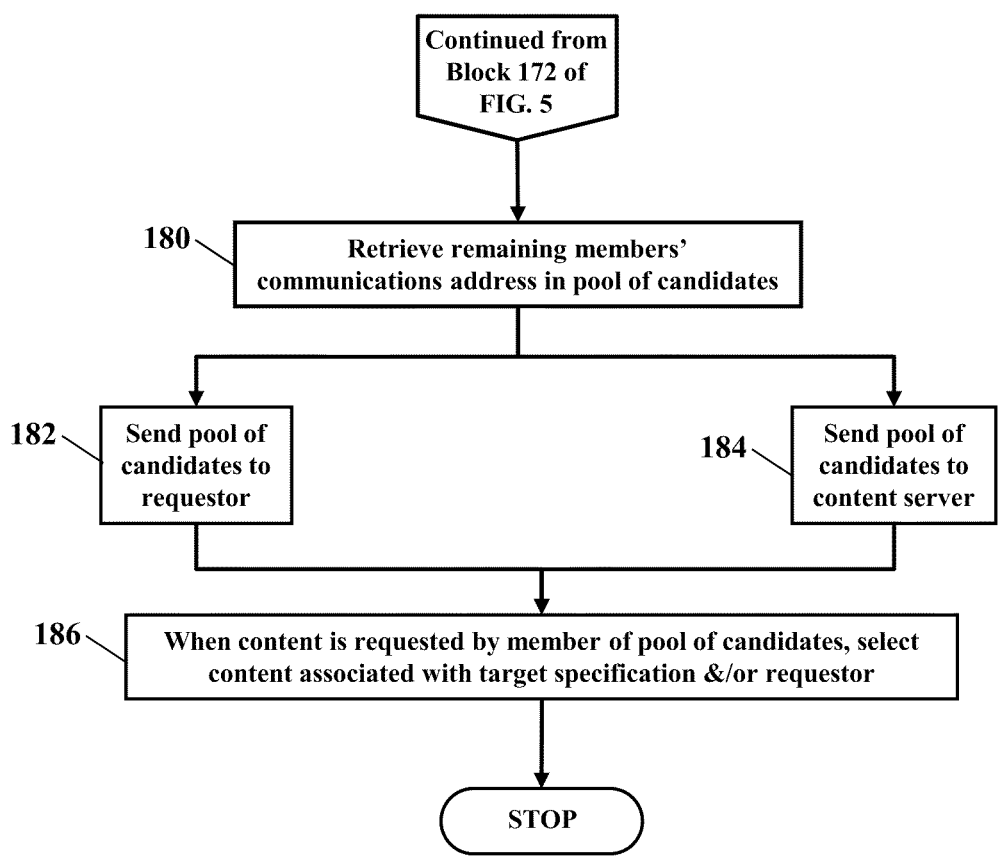

The flowchart continues with FIG. 6. After the pool 40 of candidates has been filtered for those communications addresses that "opted out" of targeted content, then the remaining addresses in the pool 40 of candidates are retrieved (Block 180). The remaining pool 40 of candidates (e.g., a listing of communications addresses associated with the target specification 28) may be sent or returned to the requesting advertiser's server (Block 182). The remaining pool 40 of candidates may also be sent to a content server (Block 184). When content is requested by a member of the pool 40 of candidates, the advertiser's content (who paid the exclusive fee 126) associated with the target specification 28 is exclusively selected and sent, according to the terms associated with the exclusive fee 126 (Block 186).

Figure 7:
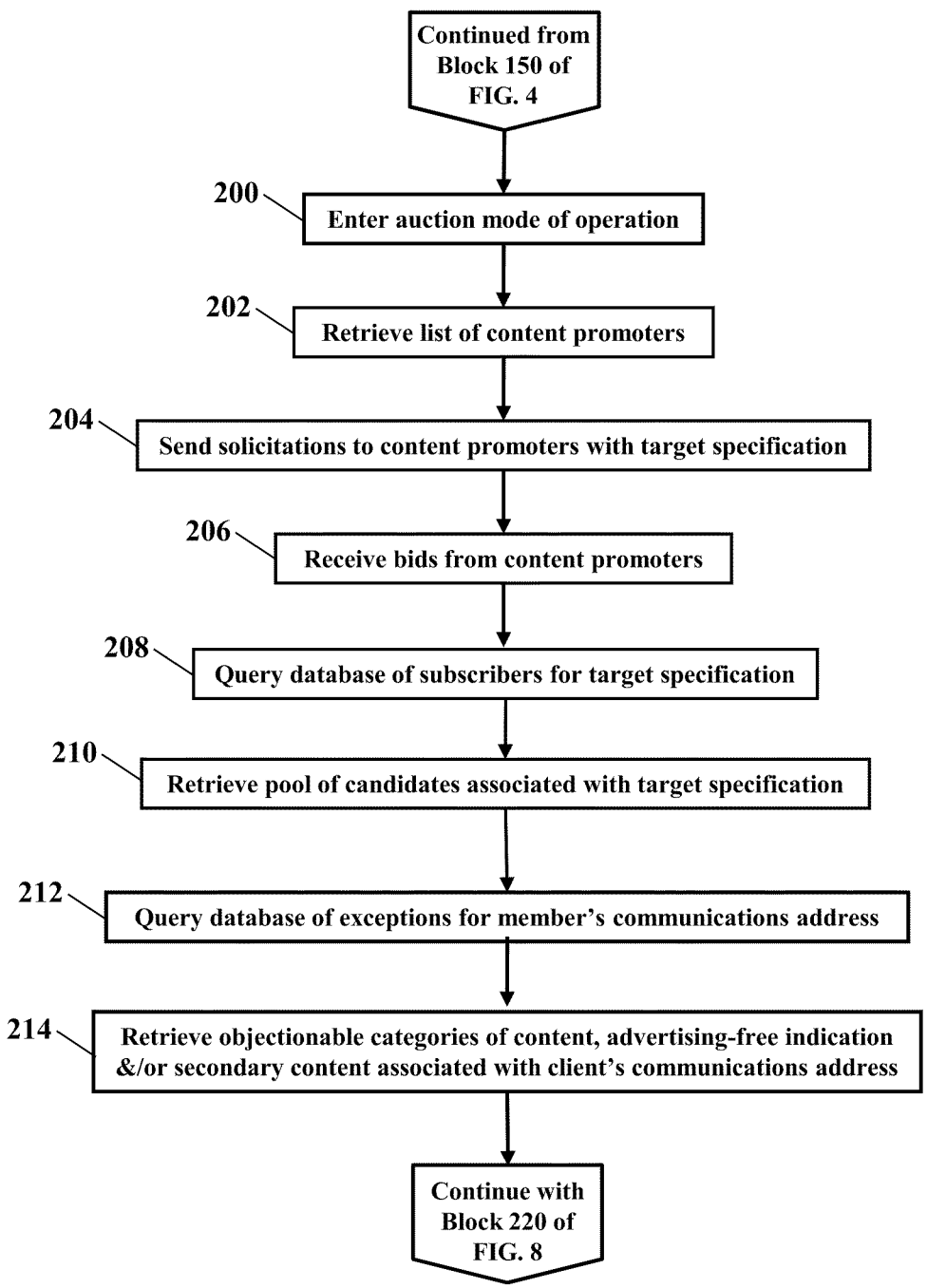

The flowchart continues with FIG. 7. If the exclusive fee 126 is not accepted (see Block 150 of FIG. 4), then the advertiser or content promoter either accepted the lesser non-exclusive fee 128 or declined in toto to pay for the resultant pool 40 of candidates. The method, then, may enter an auction mode of operation (Block 200). Because the requesting advertiser or content promoter declined to pay for exclusive use of the search results, bids may be solicited from other advertisers who may covet the target specification 28. A list of content promoters is retrieved from memory (Block 202). The list of content promoters may include communications addresses (such as email addresses, physical addresses, or server addresses) to whom solicitations are sent (Block 204). Each solicitation may include the target specification 28. The content promoters review the target specification 28 and decide whether a formal bid is best for their content. Each content promoter, who wishes to participate, submits a bid, and the bids are received (Block 206). The database 42 of subscribers is queried for the target specification 28 (Block 208). The search results yield the pool 40 of candidates that are associated with the target specification 28 (Block 210).

Again, though, some members may have "opted out" of content. FIG. 7, then, again illustrates checks that remove a member from the pool 40 of candidates. The database 70 of exceptions may be queried for a member's communications address (Block 212). The database 70 of exceptions returns the objectionable categories of content, the advertising-free indication 74, and/or the secondary content 30 associated with each client's communications address (Block 214).

Figure 8:
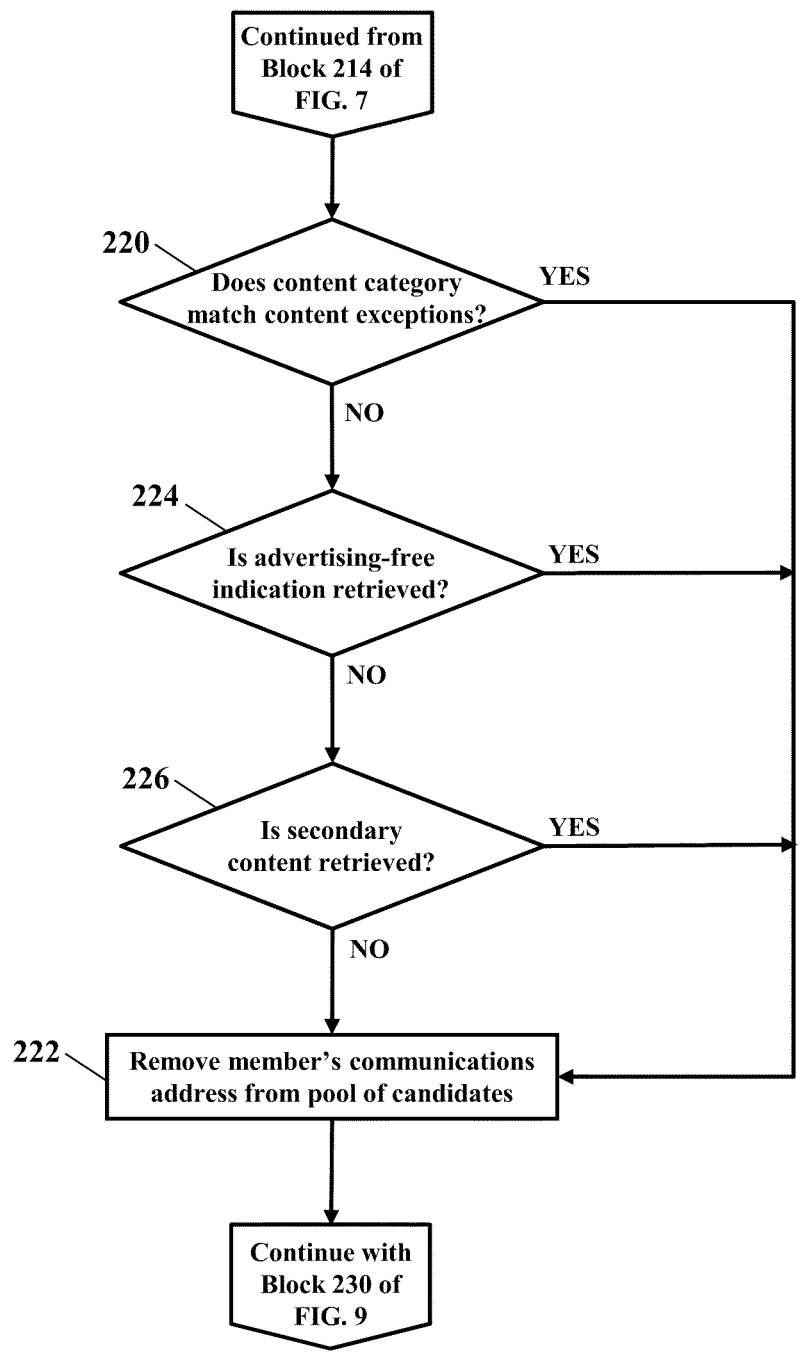

The flowchart continues with FIG. 8. If the content category associated with the requesting content promoter's content 30 (who paid the non-exclusive fee 126) matches the content exceptions 72 associated with the client device 20 (Block 220), then the target server 22 may remove the member's communications address from pool 40 of candidates (Block 222). If the advertising-free indication 74 is retrieved (Block 224), then the target server 22 may also remove the member's communications address from pool 40 of candidates (Block 222). If the secondary content 30 is retrieved (Block 226), then the target server 22 may also remove the member's communications address from pool 40 of candidates (Block 222).

Figure 9:
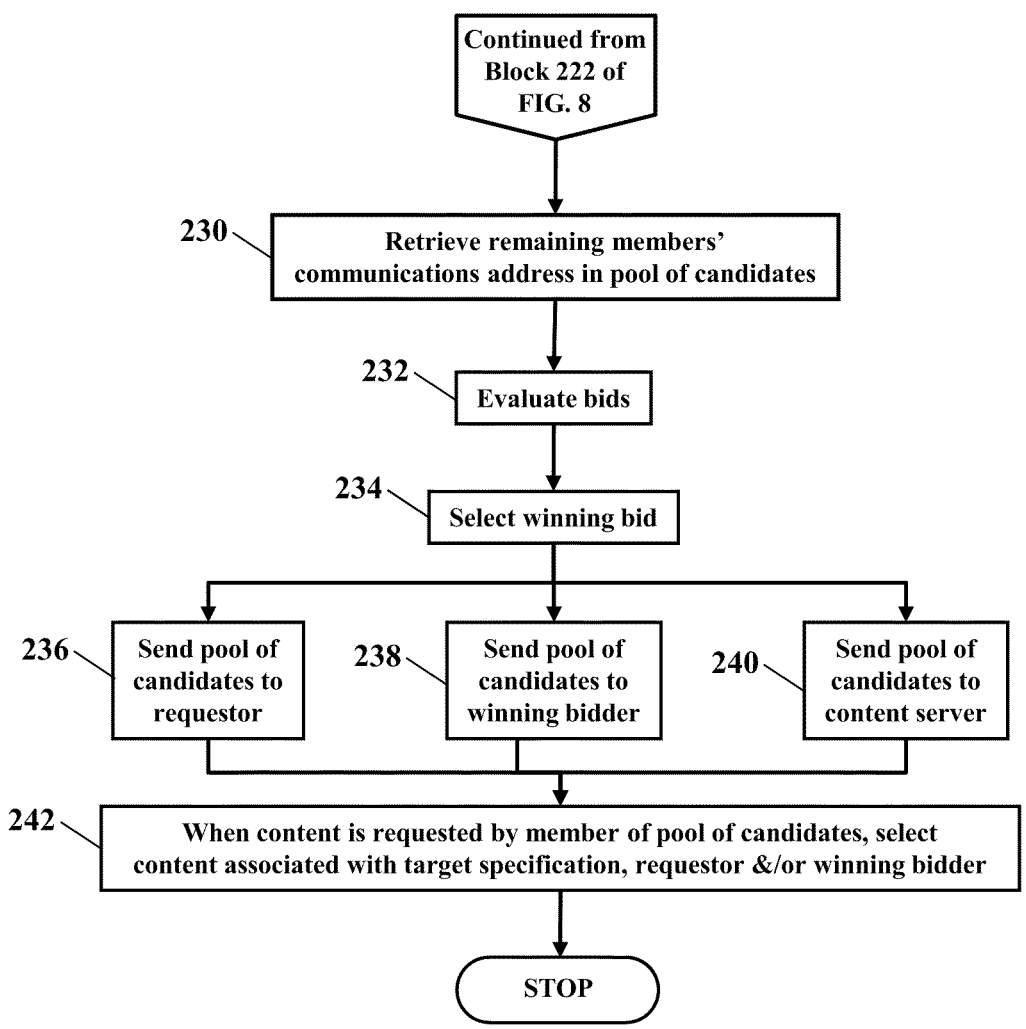

The flowchart continues with FIG. 9. After the pool 40 of candidates has been filtered for those communications addresses that "opted out" of targeted content, then the remaining addresses in the pool 40 of candidates are retrieved (Block 230). Because the auction mode of operation has been entered, and bids have been received, the bids are evaluated (Block 232) against each other and/or against auction rules. A winning bid is selected (Block 234). Here, then, even though a content promoter requested the target specification 28, other content promoters are able to bid for the same target specification 28. The remaining pool 40 of candidates may be sent to the original, requesting content promoter that paid the non-exclusive fee 128 (Block 236). The remaining pool 40 of candidates, however, may also be sent to the winning bidder (Block 238). Exemplary embodiments, however, may optionally deny the winning bidder access of the pool 40 of candidates. Even though the winning bidder may have their content deliver to the pool 40 of candidates, the winning bidder may be denied the actual names/addresses within the remaining pool 40 of candidates. Privacy or proprietary concerns may prevent pool members from being revealed to the bidders and/or the winning bidder. The pool 40 of candidates, however, may also be sent to the content server (Block 240) to facilitate delivery. When content is requested by a member of the pool 40 of candidates, then the content 30 associated with either the original, requesting content promoter (who paid the non-exclusive fee 126) and/or the winning content 66 is selected (Block 242).

Bidders may submit conditions for their bids. Some bidders, for example, may bid for exclusive use of the resultant pool 40 of candidates. Some bidders may specify dates and/or times for which their content is delivered. Some bidders may even establish maximum spending parameters at any level of bid. A bidder, for example, may set a total maximum bid of $10,000,000, with no more than $1,000,000 per day incurred. Moreover, the bidder may be less interested in general requests for content that match broad categories of demographics. The bidder, then, may specify that only $1,000 per day be incurred on general requests for advertising content (e.g., generic "give me content" requests for any content).

Two different parties may thus be associated with the same target specification 28. If the original, requesting content promoter only agreed to the non-exclusive fee 126, then the auction also resulted in the winning bidder. Potentially two different parties have thus paid a fee (or other consideration) for the same pool 40 of candidates that are associated with the target specification 28. That is, the original, requesting content promoter paid the non-exclusive fee 126 to develop the pool 40 of candidates, and the winning bidder submitted the winning bid 64 for the same pool 40 of candidates. Two different parties may thus be associated with the same target specification 28 and the same pool 40 of candidates. If two advertisements are sent to a member of the pool 40 of candidates, then each content promoter may have their respective content sent to the member's communications device. When, however, only a single advertisement is sent, then some priority scheme must decide which content is delivered. An auction rule, for example, may establish that the original, requesting content promoter (who agreed to pay the non-exclusive fee 126) may have priority over the winning bidder's winning content 66. The winning bid 64, however, may include a proviso or condition that the winning content 66 has priority over the original, requesting content promoter. If the original, requesting content promoter is informed of the winning bid 64, the original content promoter may be given an opportunity to pay the exclusive fee 126 for exclusive use of the search results. The winning bidder may also be given an opportunity to pay the exclusive fee 126 for exclusive use of the search results. The auction mode of operation may thus result in higher fees for the pool 40 of candidates associated with the target specification 28.

Figure 10:
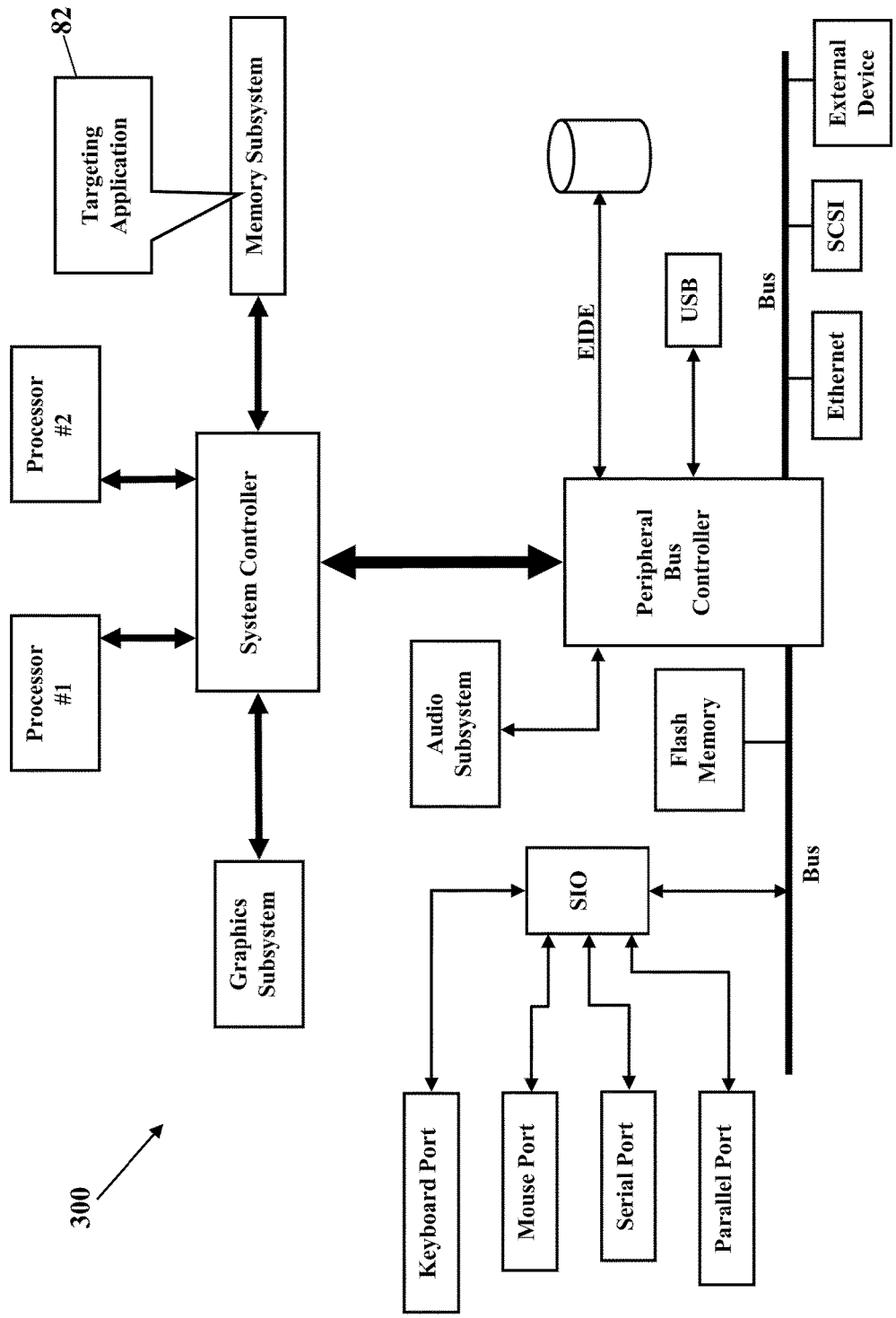
FIG. 10 is a schematic illustrating a processor-controlled device, according to exemplary embodiments.
Figure 11:
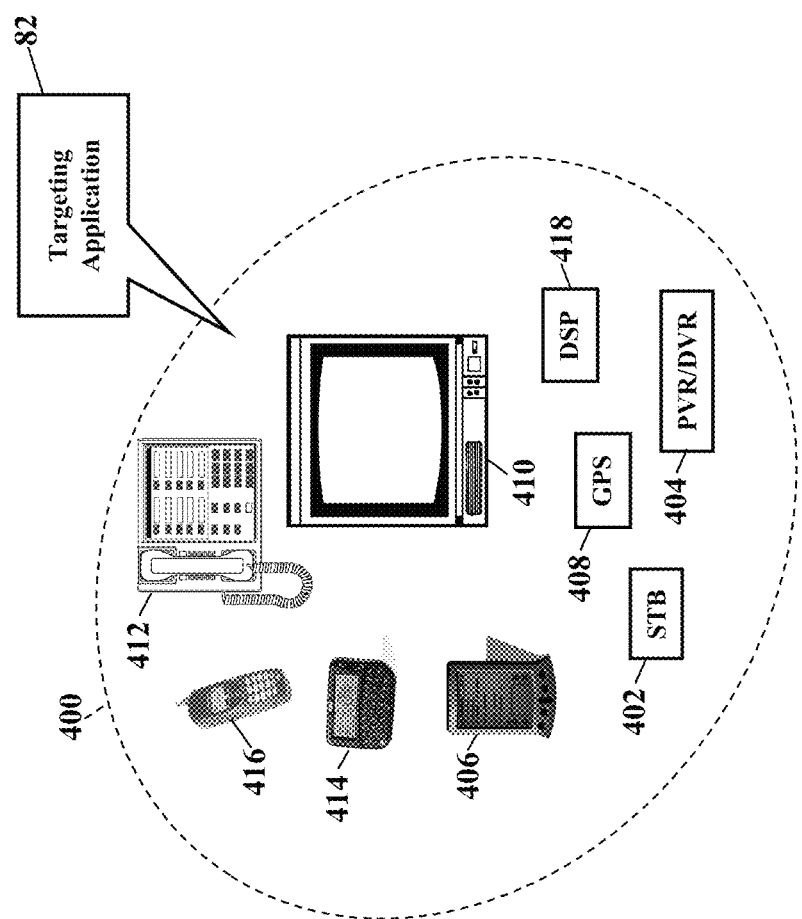
FIG. 11 depicts other possible operating environments for additional aspects of the exemplary embodiments.

FIG. 10 is a schematic illustrating still more exemplary embodiments. FIG. 10 is a generic block diagram illustrating the targeting application 82 operating within a processor-controlled device 300. FIGS. 1-3 illustrate the targeting application 82 operating within the target server 22. As this disclosure above explained, though, the targeting application 82 may operate in any processor-controlled device 300. FIG. 7, then, illustrates the targeting application 82 stored in a memory subsystem of the processor-controlled device 300. One or more processors communicate with the memory subsystem and execute the targeting application 82. Because the processor-controlled device 300 illustrated in FIG. 7 is well-known to those of ordinary skill in the art, no detailed explanation is needed.

FIG. 8 depicts other possible operating environments for additional aspects of the exemplary embodiments. FIG. 8 illustrates the targeting application 82 operating within various other devices 400. FIG. 8, for example, illustrates that the targeting application 82 may entirely or partially operate within a set-top box ("STB") (402), a personal/digital video recorder (PVR/DVR) 404, personal digital assistant (PDA) 406, a Global Positioning System (GPS) device 408, an interactive television 410, an Internet Protocol (IP) phone 412, a pager 414, a cellular/satellite phone 416, or any computer system, communications device, or processor-controlled device utilizing the processor 80 and/or a digital signal processor (DP/DSP) 418. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME)* interface (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for targeting content to the pool 40 of candidates based on the demographic information 44.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A memory device storing instructions that when executed cause a hardware processor to perform operations, the operations comprising:

receiving a request for content at a network server, the request for content from a client device;

receiving an Internet Protocol stream of data by the network server responsive to the request for the content;

determining an advertising slot in the Internet Protocol stream of data;

receiving a target specification associated with the advertising slot in the Internet Protocol stream of data, the target specification specifying an average bit rate of content consumption;

querying an electronic database for the target specification specifying the average bit rate of content consumption, the electronic database electronically associating Internet protocol addresses associated with mobile devices to average bit rates of content consumption including the average bit rate of content consumption specified by the target specification associated with the advertising slot in the Internet Protocol stream of data;

retrieving the Internet protocol addresses from the electronic database that are electronically associated with the average bit rate of content consumption specified by the target specification associated with the advertising slot in the Internet Protocol stream of data;

receiving electronic bids for the Internet protocol addresses that are electronically associated with the average bit rate of content consumption, the electronic bids received from advertisers bidding for the Internet protocol addresses that are electronically associated with the average bit rate of content consumption specified by the target specification;

selecting a winning bid of the electronic bids;

determining a winning content associated with the winning bid;

querying an electronic database of exceptions for each one of the Internet protocol addresses that are electronically associated with the average bit rate of content consumption specified by the target specification, the electronic database of exceptions electronically associating content exceptions to the Internet protocol addresses;

identifying a subscriber's objectionable content of the content exceptions in the electronic database of exceptions that is associated with any of the Internet protocol addresses that are electronically associated with the average bit rate of content consumption specified by the target specification;

comparing the subscriber's objectionable content to the winning content associated with the winning bid;

removing a subscriber's Internet protocol address from the Internet protocol addresses that are electronically associated with the average bit rate of content consumption specified by the target specification in response to the subscriber's objectionable content matching the winning content associated with the winning bid;

identifying a subscriber's advertising-free indication of the content exceptions in the electronic database of exceptions that is associated with any of the Internet protocol addresses that are electronically associated with the average bit rate of content consumption specified by the target specification;

removing the subscriber's Internet protocol address from the Internet protocol addresses that are electronically associated with the average bit rate of content consumption specified by the target specification in response to the identifying of the subscriber's advertising-free indication in the electronic database of exceptions;

identifying a subscriber's secondary content of the content exceptions in the electronic database of exceptions that is associated with any of the Internet protocol addresses that are electronically associated with the average bit rate of content consumption specified by the target specification;

removing the subscriber's Internet protocol address from the Internet protocol addresses that are electronically associated with the average bit rate of content consumption specified by the target specification in response to the identifying of the subscriber's secondary content in the electronic database of exceptions;

determining remaining Internet protocol addresses in the Internet protocol addresses that remain after the removing of the subscriber's Internet protocol address due to the subscriber's objectionable content, the subscriber's advertising-free indication, and the subscriber's secondary content;

inserting the winning content by the network server into the advertising slot in the Internet Protocol stream of data; and streaming the winning content inserted into the advertising slot in the Internet Protocol stream of data from the network server to the remaining Internet protocol addresses that are associated with the average bit rate of content consumption specified by the target specification.

2. The memory device of claim 1, wherein the operations further comprise determining that at least two of the advertisers are associated with the remaining Internet protocol addresses.

3. The memory device of claim 2, wherein the operations further comprise determining a priority between the at least two of the advertisers for the inserting of the winning content into the advertising slot in the Internet Protocol stream of data.

4. The memory device of claim 3, wherein the operations further comprise determining the priority between the at least two of the advertisers based on which one of the advertisers submitted the target specification.

5. A system, comprising:
a hardware processor; and
a memory device, the memory device storing code, the code when executed causing the hardware processor to perform operations, the operations comprising:
receiving a request for content at a network server, the request for content from a client device;
receiving an Internet Protocol stream of data by the network server responsive to the request for the content;
determining an advertising slot in the Internet Protocol stream of data;
receiving a target specification associated with the advertising slot in the Internet Protocol stream of data, the target specification specifying an average bit rate of content consumption;
querying an electronic database for the target specification specifying the average bit rate of content consumption, the electronic database electronically associating Internet protocol addresses associated with mobile devices to average bit rates of content consumption including the average bit rate of content consumption specified by the target specification associated with the advertising slot in the Internet Protocol stream of data;
retrieving the Internet protocol addresses from the electronic database that are electronically associated with the average bit rate of content consumption specified by the target specification associated with the advertising slot in the Internet Protocol stream of data;
receiving electronic bids for the Internet protocol addresses that are electronically associated with the average bit rate of content consumption, the electronic bids received from advertisers bidding for the Internet protocol addresses that are electronically associated with the average bit rate of content consumption specified by the target specification;
selecting a winning bid of the electronic bids;
determining a winning content associated with the winning bid;
querying an electronic database of exceptions for each one of the Internet protocol addresses that are electronically associated with the average bit rate of content consumption specified by the target specification, the electronic database of exceptions electronically associating content exceptions to the Internet protocol addresses;
identifying a subscriber's objectionable content of the content exceptions in the electronic database of exceptions that is associated with any of the Internet protocol addresses that are electronically associated with the average bit rate of content consumption specified by the target specification;
comparing the subscriber's objectionable content to the winning content associated with the winning bid;
removing a subscriber's Internet protocol address from the Internet protocol addresses that are electronically associated with the average bit rate of content consumption specified by the target specification in response to the subscriber's objectionable content matching the winning content associated with the winning bid;
identifying a subscriber's advertising-free indication of the content exceptions in the electronic database of exceptions that is associated with any of the Internet protocol addresses that are electronically associated with the average bit rate of content consumption specified by the target specification;
removing the subscriber's Internet protocol address from the Internet protocol addresses that are electronically associated with the average bit rate of content consumption specified by the target specification in response to the identifying of the subscriber's advertising-free indication in the electronic database of exceptions;
identifying a subscriber's secondary content of the content exceptions in the electronic database of exceptions that is associated with any of the Internet protocol addresses that are electronically associated with the average bit rate of content consumption specified by the target specification;
removing the subscriber's Internet protocol address from the Internet protocol addresses that are electronically associated with the average bit rate of content consumption specified by the target specification in response to the identifying of the subscriber's secondary content in the electronic database of exceptions;
determining remaining Internet protocol addresses in the Internet protocol addresses that remain after the removing of the subscriber's Internet protocol address due to the subscriber's objectionable content, the subscriber's advertising-free indication, and the subscriber's secondary content;
inserting the winning content by the network server into the advertising slot in the Internet Protocol stream of data; and
streaming the winning content inserted into the advertising slot in the Internet Protocol stream of data from the network server to the remaining Internet protocol addresses that are associated with the average bit rate of content consumption specified by the target specification.

6. A method, comprising:
receiving, by a network server, a request for content from a client device;
receiving, by the network server, an Internet Protocol stream of data responsive to the request for the content;
determining, by the network server, an advertising slot in the Internet Protocol stream of data;
receiving, by the network server, a target specification associated with the advertising slot in the Internet Protocol stream of data, the target specification specifying an average bit rate of content consumption;

querying, by the network server, an electronic database for the target specification specifying the average bit rate of content consumption, the electronic database electronically associating Internet protocol addresses associated with mobile devices to average bit rates of content consumption including the average bit rate of content consumption specified by the target specification associated with the advertising slot in the Internet Protocol stream of data;

retrieving, by the network server, the Internet protocol addresses from the electronic database that are electronically associated with the average bit rate of content consumption specified by the target specification associated with the advertising slot in the Internet Protocol stream of data;

receiving, by the network server, electronic bids for the Internet protocol addresses that are electronically associated with the average bit rate of content consumption, the electronic bids received from advertisers bidding for the Internet protocol addresses that are electronically associated with the average bit rate of content consumption specified by the target specification;

selecting, by the network server, a winning bid of the electronic bids;

determining, by the network server, a winning content associated with the winning bid;

querying, by the network server, an electronic database of exceptions for each one of the Internet protocol addresses that are electronically associated with the average bit rate of content consumption specified by the target specification, the electronic database of exceptions electronically associating content exceptions to the Internet protocol addresses;

identifying, by the network server, a subscriber's objectionable content of the content exceptions in the electronic database of exceptions that is associated with any of the Internet protocol addresses that are electronically associated with the average bit rate of content consumption specified by the target specification;

comparing, by the network server, the subscriber's objectionable content to the winning content associated with the winning bid;

removing, by the network server, a subscriber's Internet protocol address from the Internet protocol addresses that are electronically associated with the average bit rate of content consumption specified by the target specification in response to the subscriber's objectionable content matching the winning content associated with the winning bid;

identifying, by the network server, a subscriber's advertising-free indication of the content exceptions in the electronic database of exceptions that is associated with any of the Internet protocol addresses that are electronically associated with the average bit rate of content consumption specified by the target specification;

removing, by the network server, the subscriber's Internet protocol address from the Internet protocol addresses that are electronically associated with the average bit rate of content consumption specified by the target specification in response to the identifying of the subscriber's advertising-free indication in the electronic database of exceptions;

identifying, by the network server, a subscriber's secondary content of the content exceptions in the electronic database of exceptions that is associated with any of the Internet protocol addresses that are electronically associated with the average bit rate of content consumption specified by the target specification;

removing, by the network server, the subscriber's Internet protocol address from the Internet protocol addresses that are electronically associated with the average bit rate of content consumption specified by the target specification in response to the identifying of the subscriber's secondary content in the electronic database of exceptions;

determining, by the network server, remaining Internet protocol addresses in the Internet protocol addresses that remain after the removing of the subscriber's Internet protocol address due to the subscriber's objectionable content, the subscriber's advertising-free indication, and the subscriber's secondary content;

inserting, by the network server, the winning content by the network server into the advertising slot in the Internet Protocol stream of data; and streaming, by the network server, the winning content inserted into the advertising slot in the Internet Protocol stream of data from the network server to the remaining Internet protocol addresses that are associated with the average bit rate of content consumption specified by the target specification.

* * * * *